(12) United States Patent
Guo

(10) Patent No.: US 10,331,871 B2
(45) Date of Patent: Jun. 25, 2019

(54) PASSWORD INPUT INTERFACE

(71) Applicant: Alibaba Group Holding Limited, Grand Cayman (KY)

(72) Inventor: Wei Guo, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 309 days.

(21) Appl. No.: 14/730,115

(22) Filed: Jun. 3, 2015

(65) Prior Publication Data

US 2015/0356288 A1    Dec. 10, 2015

(30) Foreign Application Priority Data

Jun. 5, 2014 (CN) .......................... 2014 1 0247713

(51) Int. Cl.
*G06F 3/048* (2013.01)
*G06F 21/36* (2013.01)
*G06F 21/31* (2013.01)

(52) U.S. Cl.
CPC .............. *G06F 21/36* (2013.01); *G06F 21/31* (2013.01)

(58) Field of Classification Search
CPC .... G06F 3/04886; G06F 3/0237; G06F 21/36; G06F 21/83; G06F 3/04883; G06F 21/31
See application file for complete search history.

(56) References Cited

U.S. PATENT DOCUMENTS 8,117,652 B1 * 2/2012 Lu ........................ G06F 21/31
                                                713/182
2004/0212595 A1    10/2004 Zhou
2005/0091338 A1 * 4/2005 de la Huerga ........ A61J 1/1437
                                                709/217
2005/0184999 A1 * 8/2005 Daioku ................. G06F 3/0482
                                                345/589
2005/0212763 A1 * 9/2005 Okamura ............ G06F 3/04886
                                                345/156
2007/0051792 A1    3/2007 Wheeler et al.
(Continued)

FOREIGN PATENT DOCUMENTS

CN          102364427 A      2/2012
CN          103257803 A      8/2013
(Continued)

OTHER PUBLICATIONS

Chowdhury et al., A study of Mnemonic Image Passwords; 2014; IEEE ; 8 pages.*

(Continued)

*Primary Examiner* — Linh K Pham
(74) *Attorney, Agent, or Firm* — Lee & Hayes, P.C.

(57) ABSTRACT

A trigger instruction is received to set a password input interface. A setting of a term represented by a key is triggered. A selection or input of the term represented by the key on the password input interface is received. A first corresponding relationship between the key and the represented term is established. The password input interface is displayed. An electronic device sets terms, which are commonly used by a user to set a password, in a same password input interface. Thus, when a user password includes different types of terms, the user inputs the password without switching among different input interfaces to ensure that the user input the password conveniently.

20 Claims, 8 Drawing Sheets

(56) References Cited

U.S. PATENT DOCUMENTS

| | | | |
|---|---|---|---|
| 2008/0022226 A1* | 1/2008 | Brown | G06F 3/0233 715/825 |
| 2008/0195976 A1* | 8/2008 | Cho | G06F 3/0233 715/840 |
| 2009/0158406 A1* | 6/2009 | Jancula | G06F 21/46 726/5 |
| 2009/0183098 A1 | 7/2009 | Casparian et al. | |
| 2009/0235197 A1* | 9/2009 | Chen | G06F 21/36 715/780 |
| 2009/0300732 A1* | 12/2009 | Hwang | G06F 21/36 726/5 |
| 2010/0060585 A1* | 3/2010 | Chiu | G06F 3/04886 345/168 |
| 2010/0319057 A1* | 12/2010 | Murai | G06F 21/305 726/5 |
| 2011/0260981 A1 | 10/2011 | O Chen et al. | |
| 2012/0204247 A1* | 8/2012 | Leahy | G06F 21/36 726/7 |
| 2012/0206385 A1* | 8/2012 | Seo | G06F 3/0488 345/173 |
| 2013/0046544 A1* | 2/2013 | Kay | G06F 3/04883 704/275 |
| 2013/0047237 A1* | 2/2013 | Ahn | H04L 9/3226 726/7 |
| 2014/0146054 A1* | 5/2014 | Luan | G06F 21/31 345/467 |
| 2014/0149870 A1 | 5/2014 | Griffin et al. | |
| 2014/0161356 A1* | 6/2014 | Tesch | H04L 51/063 382/196 |
| 2014/0248590 A1* | 9/2014 | McCormick | G09B 5/06 434/157 |
| 2014/0310805 A1* | 10/2014 | Kandekar | G06F 21/36 726/19 |
| 2014/0337941 A1* | 11/2014 | Kominar | G06F 21/45 726/6 |
| 2014/0366112 A1* | 12/2014 | Hamana | H04L 63/083 726/7 |
| 2015/0100913 A1* | 4/2015 | Park | G06F 21/83 715/773 |
| 2015/0116222 A1 | 4/2015 | Heberlein et al. | |
| 2015/0121489 A1* | 4/2015 | Yang | G06F 21/36 726/6 |
| 2015/0135291 A1* | 5/2015 | Yang | G06F 21/31 726/6 |
| 2015/0178490 A1* | 6/2015 | Tamboly | G06F 21/36 726/4 |
| 2015/0205942 A1* | 7/2015 | Yang | G06F 21/31 726/19 |
| 2015/0286816 A1* | 10/2015 | Adler | G06F 21/45 726/6 |
| 2015/0312242 A1* | 10/2015 | Ogawa | G06F 21/34 726/6 |
| 2015/0339470 A1* | 11/2015 | Bates | G06F 21/32 726/18 |
| 2017/0302648 A1* | 10/2017 | Ferrydiansyah | H04L 63/083 |

FOREIGN PATENT DOCUMENTS

| | | | | |
|---|---|---|---|---|
| WO | WO 2013149883 A1 * | 10/2013 | | G06F 3/04886 |
| WO | WO2013157864 A1 | 10/2013 | | |

OTHER PUBLICATIONS

Sadzevar et al., Universal Multi-Factor Authentication Using Graphical Passwords; 2008 IEEE; 8 pages.*

PCT Search Report and Written Opinion dated Sep. 4, 2015 for PCT Application No. PCT/US15/34074, 9 pages.

Translation of Chinese Second Office Action dated Sep. 4, 2017 for Chinese patent application No. 201410247713.8, a counterpart foreign application of U.S. Appl. No. 14/730,115, 8 pages.

Translation of Chinese Second Office Action dated May 30, 2018 for Chinese patent application No. 201410247713.8, a counterpart foreign application of U.S. Appl. No. 14/730,115, 10 pages.

CN Search Report dated Aug. 27, 2017 for CN Application No. 201410247713.8, 1 page.

* cited by examiner

PASSWORD INPUT INTERFACE

CROSS-REFERENCE TO RELATED PATENT APPLICATION

This application claims foreign priority to Chinese Patent Application No. 201410247713.8 filed on Jun. 5, 2014, entitled "Method and System for Displaying a Password Input Interface," which is hereby incorporated by reference in its entirety.

TECHNICAL FIELD

The present disclosure relates to the field of information security technology, and, more particularly, to a method and system for displaying a password input interface.

BACKGROUND

In daily life, there are many opportunities to input passwords. For example, a user needs to input a corresponding password in a device such as a bank self-service terminal, a point of sale (POS) machine, and an online bank. The corresponding password may include a bank account password, a mobile phone password, a bank card password, an e-mail box login password, etc. The password generally includes multiple characters, and the characters may be a numeral, a letter, a character, or a symbol. The character may include a Chinese character, a Japanese character, etc. The symbol may include a punctuation mark. Generally, inputting a user password includes inputting the password on a keyboard of a fixed password input device or inputting the password on a screen of a device terminal. Along with the development of network technologies, the user has an increasing demand for inputting a password on a screen of a device terminal. For example, the user needs to input a password on a screen of a mobile phone.

Existing methods of displaying a password input interface may include the following.

One is a method using a general input method interface, which specifically includes calling a general input method when a user needs to input a password, and inputting a user password on an interface of the general input method. For example, the user password is input by calling a general input method such as Sougou input method and Baidu™ input method. Generally, since there are many characters, the general input method distributes different types of characters on different input interfaces. For example, letters may be input on an English input interface, numerals may be input on a numeral input interface, and symbols may be input on a symbol input interface. When the password of the user includes at least two of a letter, a character, a numeral, and a symbol, the user inputs the password by switching among input interfaces.

The other is a method using an input method interface built in specific software, which specifically includes calling a software built-in input method when the user needs to input a password, and inputting the password of the user on an input interface of the software built-in input method. For example, when a client terminal needs to input a password of a certain bank card, the password may be input by calling a built-in input method in the client terminal software of the bank. Similar to the general input method, the built-in input method may distribute different types of characters on different input interfaces. A distribution of the input interface of the built-in input method and that of the general input method may be different.

The existing techniques have at least the following problems:

Different types of terms usually exist in a user password, and when a user inputs the password by using an input interface of the above-mentioned two password input interface display methods, it is necessary to switch among input interfaces of various types of terms, thus making the operation complicated.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present disclosure provides an example password input interface display method and system to implement a convenient password input for a user.

To solve the above technical problems of the existing techniques, the present disclosure provides an example password input interface display method and system, which are implemented as follows.

A password input interface display method includes the following operations. A trigger instruction is received from a user to set a password input interface. A password input interface including arranged keys is displayed. A setting of a term represented by a key is triggered. A user's selection and/or input of the term represented by the key on the password input interface is received. A first corresponding relationship between the key and the represented term is established. An instruction from the user that completes the setting of the term represented by the key is received. An instruction from the user that completes the setting of the password input interface is received. A setting of the password input interface is completed. The password input interface is displayed.

In an example embodiment, the receiving user's selection and/or input of the term represented by the key on the password input interface includes receiving a term selected and/or input by the user. The term includes a letter, a numeral, a character, or a symbol, or a special character such as a blank space selected and/or input by the user.

In an example embodiment, the displaying the password input interface includes displaying the password input interface according to the first corresponding relationship between the key and the represented term.

In an example embodiment, the password input method further includes receiving display content information input and/or selected by the user, and setting a display content of the key on the password input interface according to the display content information.

In an example embodiment, the display content is consistent with the term represented by the key. Alternatively, the display content is inconsistent with the term represented by the key.

In an example embodiment, the inconsistence between the display content and the term represented by the key specifically includes that the display content is blank, or the display content is a picture, or the display content is a term inconsistent with the term represented by the key.

In an example embodiment, the receiving display content information input and/or selected by the user, and setting the display content of the key on the password input interface according to the display content information specifically include receiving a trigger instruction to set display content of the key, triggering a setting of the display content of the key, receiving a user's selection and/or input of the display content of the key on the password input interface, establishing a second corresponding relationship between the key and the display content, and receiving an instruction from the user that completes the setting of the display content of the key.

In an example embodiment, the password input interface is displayed according to the second corresponding relationship between the key and the display content.

In an example embodiment, the password input interface display method further includes receiving name information input by the user, and using the name information input by the user as a name of the password input interface.

In an example embodiment, the password input interface display method further includes receiving key arrangement information input by the user, and arranging and displaying the key on the password input interface according to the key arrangement information.

In an example embodiment, the key arrangement information includes a total number of keys and/or a key arrangement form.

In an example embodiment, when the key arrangement information includes the total number of keys input by the user, the total number of keys displayed on the password input interface is determined according to the total number of the received keys input by the user. The total number of the displayed keys is greater than or equal to the total number of keys input by the user.

In an example embodiment, the term includes at least one of a letter, a character, a numeral, and a symbol.

The present disclosure also provides an example password input interface display system that includes an interface setting triggering unit, a term-represented-by-key triggering unit, a term-represented-by-key setting unit, an interface setting completing unit, and an input interface displaying unit.

The interface setting triggering unit receives a trigger instruction from a user to set a password input interface, triggers a setting of the password input interface, and displays the password input interface including arranged keys. The term-represented-by-key triggering unit receives a trigger instruction to set a term represented by a key, and triggers a setting of the term represented by the key. The term-represented-by-key setting unit receives a user's selection and/or input of a term represented by the key on the password input interface, establishes a first corresponding relationship between the key and the represented term, and receives an instruction from the user that completes the setting of the term represented by the key. The interface setting completing unit receives an instruction from the user that complete the setting of the password input interface, and completes the setting of the password input interface. The input interface displaying unit displays the password input interface.

In an example embodiment, the term-represented-by-key setting unit includes a represented term receiving unit, a first corresponding relationship unit, and a term-represented-by-key completing unit. The represented term receiving unit receives the user's selection and/or input of the term represented by the key on the password input interface. The first corresponding relationship unit establishes the first corresponding relationship between the key and the represented term. The term-represented-by-key completing unit receives the instruction from the user that completes the setting of the term represented by the key, and completes the setting of the term represented by the key.

In an example embodiment, the password input interface display system further includes a display content setting unit. The display content setting unit receives display content information input and/or selected by the user, and sets the display content of the key on the password input interface according to the display content information.

In an example embodiment, the display content setting unit includes a key display content triggering unit and a key display content setting unit. The key display content triggering unit receives a trigger instruction to set a display content of the key. The key display content setting unit receives a user's selection and/or input of the display content of the key on the password input interface, establishes a second corresponding relationship between the key and the display content, and receives an instruction from the user that completes the setting of the display content of the key.

In an example embodiment, the key display content setting unit includes a display content receiving unit, a second corresponding relationship unit, and a key display content completing unit. The display content receiving unit receives a user's selection and/or input of the display content of the key on the password input interface. The second corresponding relationship unit establishes the second corresponding relationship between the key and the display content, and stores the second corresponding relationship. The key display content completing unit receives an instruction from the user that completes the setting of the display content of the key, and completes the setting of the display content of the key.

In an example embodiment, the password input interface display system further includes a name setting unit that receives name information input by the user, and uses the name information input by the user as a name of the password input interface.

In an example embodiment, the password input interface display system further includes a key setting unit that receives key arrangement information input by the user, and display the password input interface according to the key arrangement information.

In an example embodiment, the key setting unit includes an arrangement information receiving unit and a key arrangement unit. The arrangement information receiving unit receives the key arrangement information input by the user. The key arrangement information includes a total number of keys and/or a key arrangement form. The key arrangement form may include a form of a rectangular array, a form of a rhombic array, or a form of a circular array. The key arrangement unit arranges the key on the password input interface according to the key arrangement information. The total number of keys displayed on the password input interface is greater than or equal to the total number of keys input by the user.

As shown from the technical solutions provided in the above embodiments of the present disclosure, by using the password input interface display method and system provided in the embodiments of the present disclosure, an electronic device sets terms that are commonly used by a user for setting a password, at a same input interface. When a user password includes different types of terms, the user inputs the password without switching among different input interfaces to ensure that the user inputs the password conveniently. Moreover, the display content of each key may be further set. When the set display content of the key is inconsistent with the term represented by the key, even the user's process of inputting the password is peeped by another person, the techniques of the present disclosure ensure that the password of the user will not be disclosed so that the user securely inputs the password.

BRIEF DESCRIPTION OF DRAWINGS

To describe the technical solutions in the example embodiments of the present disclosure more clearly, the following briefly introduces the accompanying drawings for describing the example embodiments of the present disclosure. Apparently, the accompanying drawings in the following description merely represent some embodiments of the present disclosure, and one of ordinary skill in the art may still acquire other drawings from these accompanying drawings without using creative efforts.

DETAILED DESCRIPTION

The present disclosure provides an example password input interface display method and system.

In order for one of ordinary skill in the art to better understand the technical solutions in the present disclosure, the following describes the technical solutions in the example embodiments of the present disclosure by reference to the accompanying drawings in the present disclosure. Apparently, the described example embodiments represent merely a part rather than all of the embodiments of the present disclosure. All other embodiments acquired by one of ordinary skill in the art based on the example embodiments of the present disclosure without using creative efforts shall fall in the protection scope of the present disclosure.

With respect to a specific user, common terms used for setting a password are usually several fixed terms among all terms, and therefore, the terms used by the user to set a password may be set in an input interface.

Figure 1:
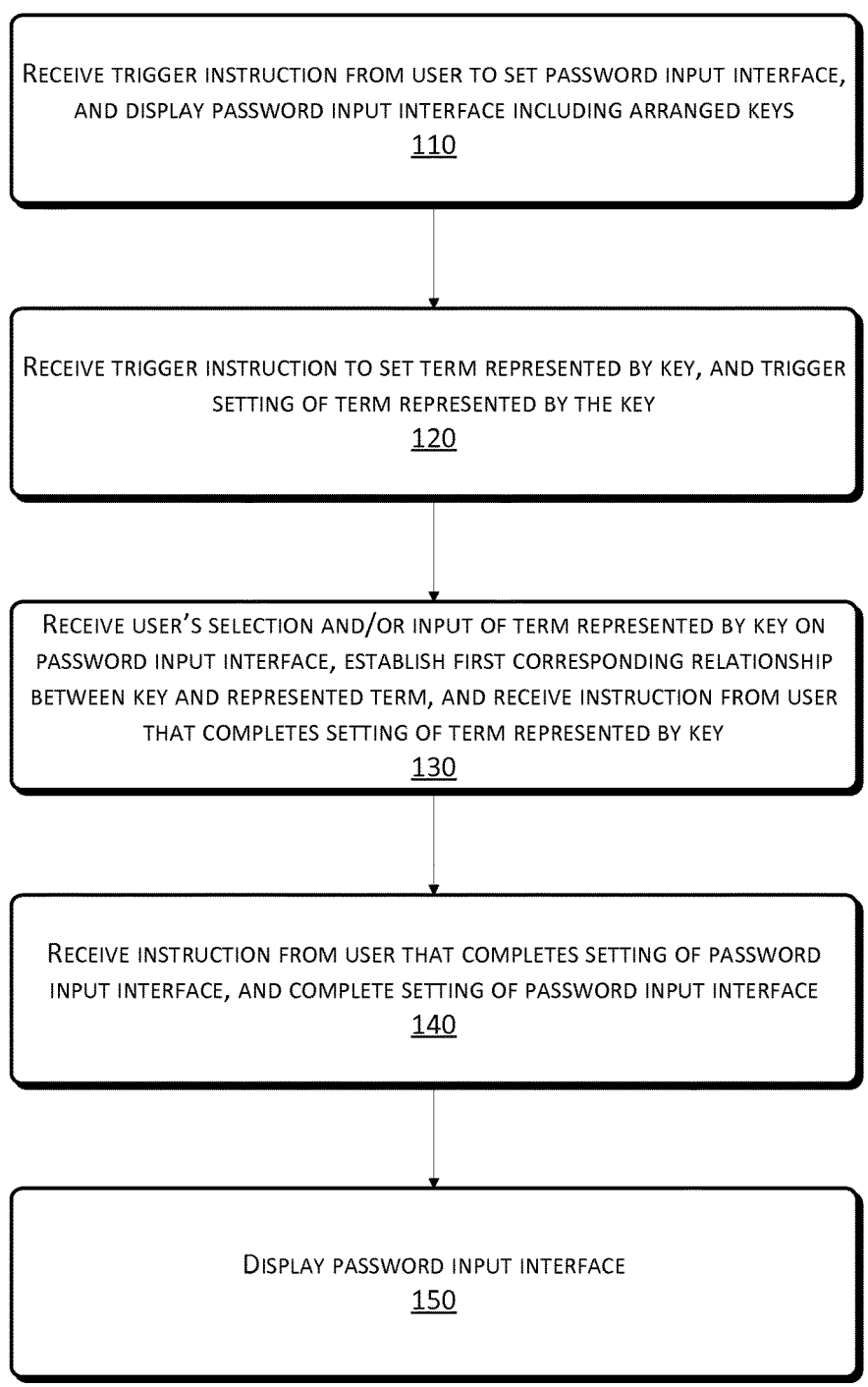
FIG. 1 is a flow chart of a first example password input interface display method according to the present disclosure.

FIG. 1 is a flow chart of a first example password input interface display method according to the present disclosure. As shown in FIG. 1, the example password input interface display method may include the following operations.

At 110, a trigger instruction from a user to set a password input interface is received, and a password input interface including arranged keys is displayed.

For example, an electronic device with a touch sensitive apparatus receives the trigger instruction from the user that sets the password input interface to start the setting of a password input display interface. For example, the user, by clicking a particular key, triggers the setting of the password input interface. Upon the receipt of the trigger instruction, the electronic device may display the password input interface including arranged keys. The arranged keys may be set in advance.

At 120, a trigger instruction to set a term represented by a key is received, and the setting of the term represented by the key is triggered.

The electronic device may receive the trigger instruction to set the term represented by the key. For example, the electronic device, upon receipt of a click operation of a particular key in the arranged keys, may trigger the setting of the term represented by the key.

At 130, a user's selection and/or input of the term represented by the key on the password input interface is received, a first corresponding relationship between the key and the represented term is established, and an instruction from the user that completes the setting of the term represented by the key is received.

In the password input interface including the arranged keys, for each key, a term represented by the key may be set to establish the first corresponding relationship between the key and the represented term. The electronic device may store the first corresponding relationship between the key and the represented term. In a process of inputting a password for verification, a term represented by the key is an actually input term. The term may include a letter, a character, a numeral, and a symbol.

For example, the electronic device may receive the user's selection and/or input of the term represented by the key on the password input interface, and establish the first corresponding relationship between the key and the represented term. The electronic device may store the first corresponding relationship.

For example, after triggering the setting of the term represented by the particular key, the electronic device may receive a term directly input by the user, the electronic device may use the term input by the user as the term represented by the key to establish the first corresponding relationship between the key and the represented term. The electronic device may store the first corresponding relationship.

For another example, after triggering the setting of the term represented by the particular key, the electronic device may display an input keyboard. The input keyboard may switch among various input keyboards such as a numeral keyboard, a letter keyboard, and a symbol keyboard. The electronic device may receive the term selected by the user on the input keyboard. The electronic device may use the received term selected by the user as the term represented by the key, and establish the first corresponding relationship between the key and the represented term. The electronic device may store the first corresponding relationship.

After the first corresponding relationship between the particular key and the represented term is established, the electronic device may receive an instruction from the user that completes the setting of the term represented by the key. For example, the user may click a confirmation button of the input keyboard or a blank place on a screen to indicate to the electronic device to complete the setting of the term represented by the key.

For example, a key may be set to represent a term. Furthermore, a key may be set to be blank as well, that is, the term represented by the key is set to be blank, and the key does not represent any term.

For example, the electronic device with a touch sensitive apparatus may receive information about a user's click on a key on the input interface, and the electronic device may display an input keyboard. If the user sets the key as "a", a letter "a" may be selected on the input keyboard. The electronic device may receive an input of the term "a" selected by the user, set the term represented by the key as "a", establish a first corresponding relationship between the key and the represented term "a". The electronic device may store the first corresponding relationship. The user may click on the enter button of the input keyboard or another blank place on the screen to complete the setting of the term represented by the key. The electronic device may receive an instruction from the user that completes the setting of the term represented by the key, and complete the setting of the term represented by the key.

At 140, an instruction from the user that completes the setting of the term represented by the password input interface is received.

The electronic device may receive an instruction from the user that completes the setting of the password input interface, and completes the setting of the password input interface. For example, the electronic device may receive a click of a confirmation button on a password input interface setting page and complete the setting of the password input interface.

At 150, the password input interface is displayed.

The electronic device may display the password input interface according to the established first corresponding relationship between the key and the represented term.

In a process of inputting a password, when the password input interface is used to input the password, since the terms for the user to set the password have been set in a same input interface, the user does not need to switch among input interfaces for different types of terms, and may input the password on the set password input interface directly.

For example, before the trigger instruction from the user that sets the password input interface is received, the method may further include the following operations.

At operation A, name information input by the user is received, and the name information input by the user is used as a name of the password input interface.

The electronic device with a touch sensitive apparatus may receive the name information input by the user, and may use the name information input by the user as a name of the password input interface.

Since types of terms of passwords that need to be input by the user vary in different situations, for example, a bank card password may merely need terms of the numeral type, while an email box login password may include terms of the numeral type and the letter type, the user sets multiple password input interfaces according to requirements. To distinguish different password input interfaces, different names may be set for different input interfaces. When the electronic device with the touch sensitive apparatus receives the name information input by the user, the name information input by the user may be used as the name of the password input interface.

For example, an input interface merely including terms of numeral type may be set, and the name of the password input interface may be set as "bank card password input," alternatively, a password input interface including terms of numeral type and letter type may be set, and the name of the password input interface may be set as "email box login password input." When the electronic device with the touch sensitive apparatus receives information of "bank card password input" or "email box login password input" input by the user, the received information may be used as the name of the password input interface.

Different names are set for different password input interfaces, and correspondingly, when the user inputs the password by using a client terminal to perform password verification, the user may select a corresponding password input interface by selecting the name of the password input interface. For example, when it is required to input a bank card password, a password input interface having a name "bank card password input" may be selected to input the password.

For example, before the trigger instruction from the user that sets the password input interface is received, the method may further include the following operations.

At operation B, key arrangement information input by the user is received, and the keys on the password input interface are arranged according to the key arrangement information.

The user inputs the key arrangement information, and the key arrangement information may include the total number of keys and/or a key arrangement form.

The electronic device may determine the total number of keys displayed on the password input interface according to the total number of keys input by the user. The total number of the displayed keys may be greater than or equal to the total number of keys input by the user.

The key arrangement form may be a form of a rectangular array, a form of a rhombic array, a form of a circular array, etc.

The electronic device with the touch sensitive apparatus may receive the key arrangement information input by the user, and display the password input interface with the key arranged according to the key arrangement information.

For example, common terms for a certain user to set a password may include 15 characters, and the total number of keys in the key arrangement information that may be input is 15. Further, the user may further input the arrangement form of the keys, for example, the keys are arranged in a form of a rectangular array. After the electronic device receives the key arrangement information, including the total number of keys and the key arrangement form, input by the user, the password input interface may be displayed. The total number of keys displayed on the password input interface may be greater than or equal to the total number of keys input by the user. For example, the key arrangement information includes that the total number of keys is 15, and the key arrangement form is rectangular; the total number of keys displayed on the password input interface may be 15 or 16. For instance, the password input interface in an arrangement of 3 rows and 5 columns may be displayed, or the password input interface in an arrangement of 4 rows and 4 columns may be displayed.

For example, the total number of keys of the user is less than 25, and is displayed completely on a screen.

For example, the password input interface display method may include operations A and B. The operation A may be performed before the operation B, or the operation B may be performed before the operation A, which is not be limited in the present disclosure.

In the above example embodiment of the password input interface display method of the present disclosure, the electronic device set, in a same input interface, the terms that are commonly used by the user to set a password, and when a user password includes terms of different types, the user inputs the password without switching among different input interfaces to ensure that the user inputs the password conveniently.

Figure 2:
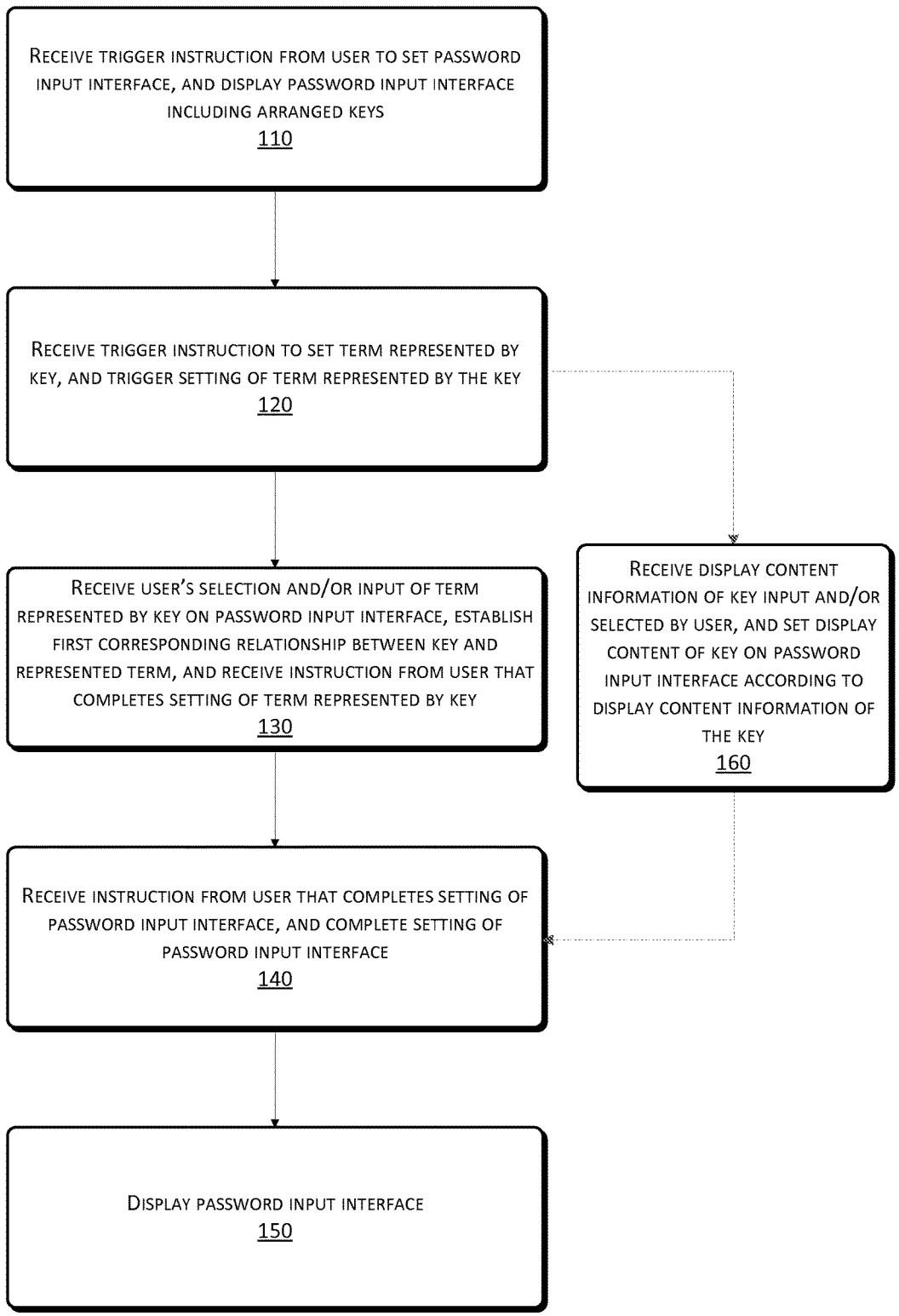
FIG. 2 is a flow chart of a second example password input interface display method according to the present disclosure.

A second example embodiment of the password input interface display method of the present disclosure is described in the following. FIG. 2 which is a flow chart of the second example embodiment of the password input interface display method according to the present disclosure. As shown in FIG. 2, a difference between this embodiment and the first embodiment of the password input interface display method is that the password input interface display method may further include the following operations.

At 160, display content information of the key input and/or selected by the user is received, and the display content of the key on the password input interface is set according to the display content information of the key.

After setting the term represented by the key, the electronic device may further set the display content of the key on the password input interface. The display content may be consistent with the term represented by the key. The display content may also be inconsistent with the term represented by the key, which specifically may include that the display content is blank, the display content is a picture, or the display content is a character inconsistent with the term represented by the key.

For example, if a term represented by a particular key is set to be "a", the display content of the key may be set as "a", and display content of the key may be set as a picture of an apple as well, the display content of the key may be set as a character "b", or the display content displayed by the key may be set as blank.

The receiving display content information of the key input and/or selected by the user, and setting the display content of the key on the password input interface according to the display content information of the key may specifically include the following operations.

At operation C, a trigger instruction to set the display content of the key is received.

The electronic device may receive the trigger instruction to set the display content of the key. For example, the electronic device, upon the receipt of a click operation on a particular key in the arranged keys, triggers the setting of the display content of the key.

At operation D, a user's selection and/or input of the display content of the key on the password input interface is received, a second corresponding relationship between the key and the display content is established, and an instruction from the user that completes the setting of the display content of the key is received.

The electronic device may receive the user's selection and/or input of the display content of the key on the password input interface, and a second corresponding relationship between the key and the display content is established. The electronic device may store the second corresponding relationship between the key and the display content.

For example, after the electronic device receives the trigger instruction to set the display content of the key, the electronic device may display a selection interface. Content on the selection interface may include a term, a picture or a blank space. The electronic device may receive content selected by the user, and use the selected content as the display content of the key, and then establish the second corresponding relationship between the key and the display content. The electronic device may store the second corresponding relationship between the key and the display content.

The electronic device may receive an instruction from the user that completes the setting of the password input interface display content, complete the setting of the password input interface display content. For example, the electronic device may receive a user's click on a confirmation button on the display content setting interface of the password input interface and complete the setting of the display content of the password input interface.

After the display content of the password input interface is set, correspondingly, as for the display of the password input interface in 150, the password input interface may be displayed according to the second corresponding relationship between the key and the display content. For example, a term represented by a key is set as a letter "a", and the display content of the key is set as a letter "b". In the user's process of inputting the password, if the letter "a" needs to be input, the user may click the key whose display content is the letter "b" on the input interface, and actually the user inputs a password with the letter "a". In this way, if the process of inputting the password is peeped, the techniques of the present disclosure ensure that the password of the user will not be disclosed.

For example, in this example embodiment, operations at 160 may be performed after 140, and may also be performed between 110 and 120, which is not be limited in the present disclosure.

Other parts of this example embodiment are the same as those in the first example embodiment of the password input interface display method of the present disclosure, and reference may be made to the first example embodiment of the password input interface display method.

In the second example embodiment of the password input interface display method, the display content of the key is set on the basis of the first embodiment of the password input interface display method. When the set display content of the key is inconsistent with the term represented by the key, even if the user's process of inputting the password is peeped by people around, the techniques of the present disclosure ensure that the password of the user will not be known, thereby ensuring that the user inputs the password safely.

Figure 3:
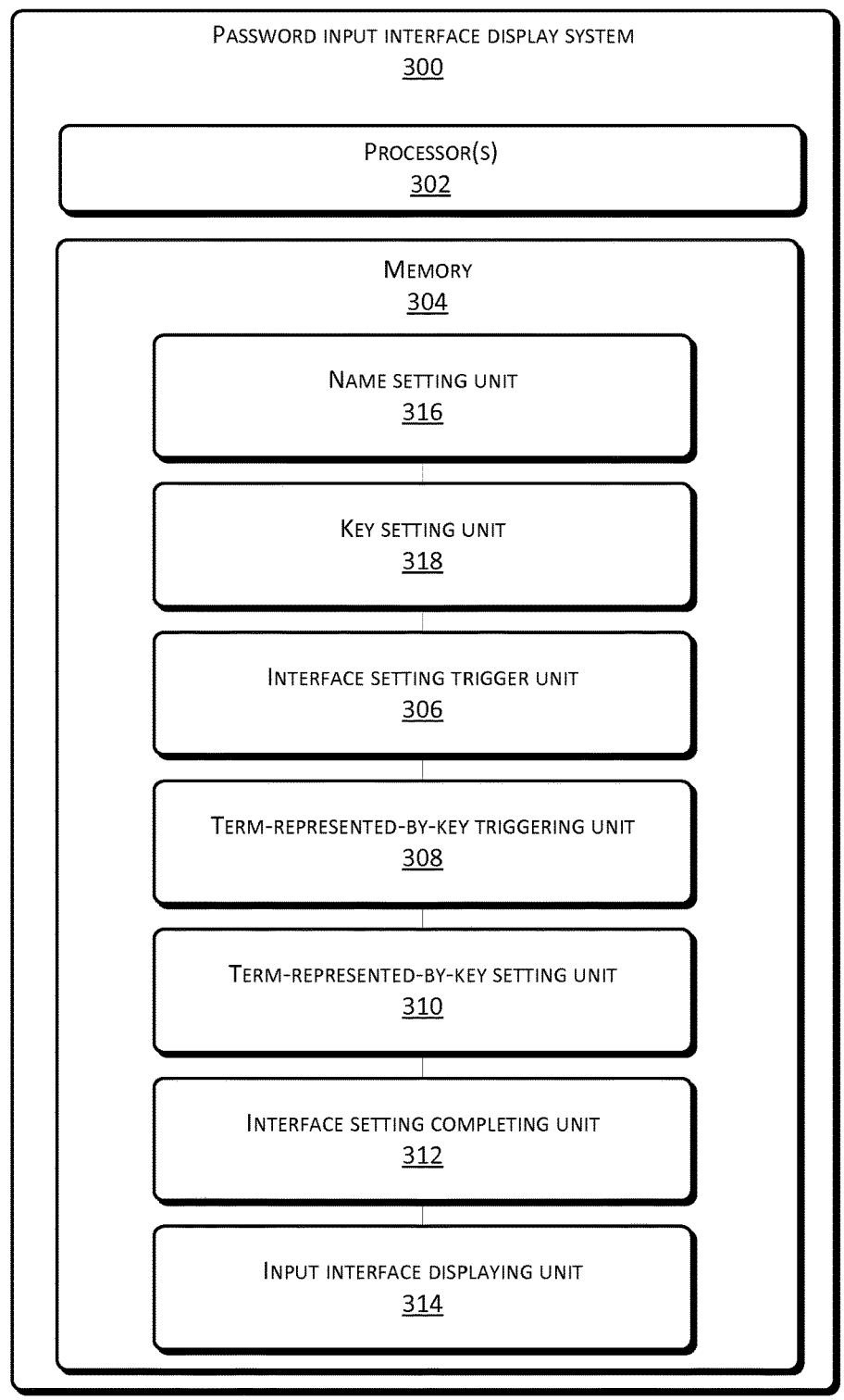
FIG. 3 is a structural diagram of a first example password input interface display system according to the present disclosure.

A first example embodiment of a password input interface display system of the present disclosure is described in the following. FIG. 3 is a structural diagram of the first example embodiment of the password input interface display system 300 according to the present disclosure. As shown in FIG. 3, the password input interface display system 300 may include one or more processor(s) or data processing unit(s) 302 and memory 304. The password input interface display system 300 may further include one or more input/output devices and network interfaces (not shown in FIG. 3). The memory 304 is an example of computer readable media.

The memory 304 may store therein a plurality of modules or units including an interface setting triggering unit 306, a term-represented-by-key triggering unit 308, a term-represented-by-key setting unit 310, an interface setting completing unit 312, and an input interface displaying unit 314.

The interface setting triggering unit 306 receives a trigger instruction from a user that sets a password input interface, and displays a password input interface including arranged keys.

The term represented by the key trigger unit 308 receives a trigger instruction to set a term represented by a key.

The term-represented-by-key setting unit 310 receives a user's selection and/or input of the term represented by a key on the password input interface, establishes a first corresponding relationship between the key and the represented term, and receives an instruction from the user that completes the setting of the term represented by the key.

Figure 4:
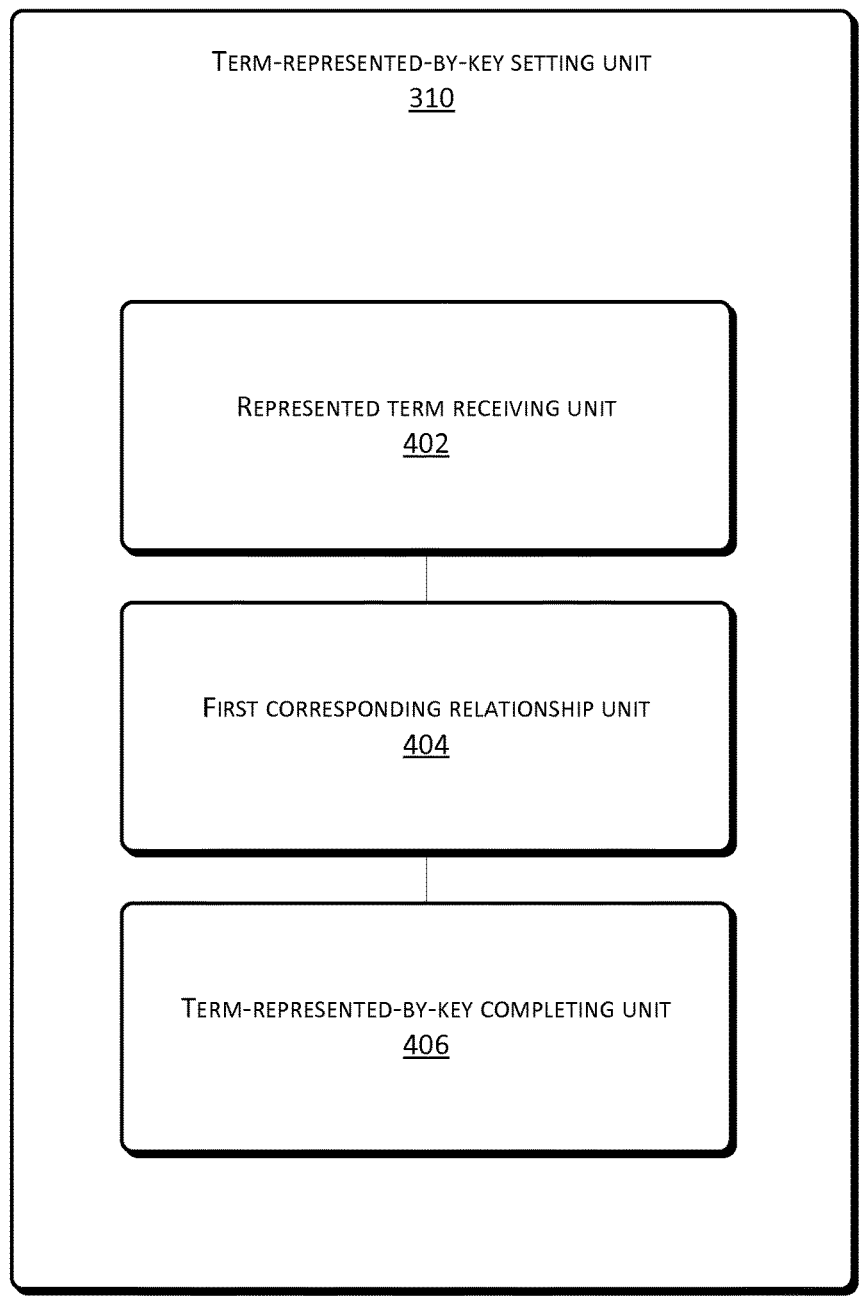
FIG. 4 is a structural diagram of an example term-represented-by-key setting unit in the first example password input interface display system according to the present disclosure.

FIG. 4 is a structural diagram of the term-represented-by-key setting unit 310 in the first example embodiment of the password input interface display system 300 according to the present disclosure. As shown in FIG. 4, the term-represented-by-key setting unit 310 may include a represented term receiving unit 402, a first corresponding relationship unit 404, and a term-represented-by-key completing unit 406.

The represented term receiving unit 402 receives a user's selection and/or input of the term represented by the key on the password input interface.

The first corresponding relationship unit 404 establishes the first corresponding relationship between the key and the represented term, and stores the first corresponding relationship.

The term-represented-by-key completing unit 406 receives the instruction from the user that completes the setting of the term represented by the key, and completes the setting of the term represented by the key.

The interface setting completing unit 312 receives an instruction from the user that completes the setting of the password input interface.

The input interface displaying unit 314 displays the password input interface.

For example, before the interface setting triggering unit 306, the password input interface display system 300 may further include a name setting unit 316. The name setting unit 316 receives name information input by the user, and uses the name information input by the user as a name of the password input interface.

For example, before the interface setting triggering unit 306, the password input interface display system 300 may further include: a key setting unit 318.

The key setting unit 318 receives key arrangement information input by the user, and displays the password input interface according to the key arrangement information.

Figure 5:
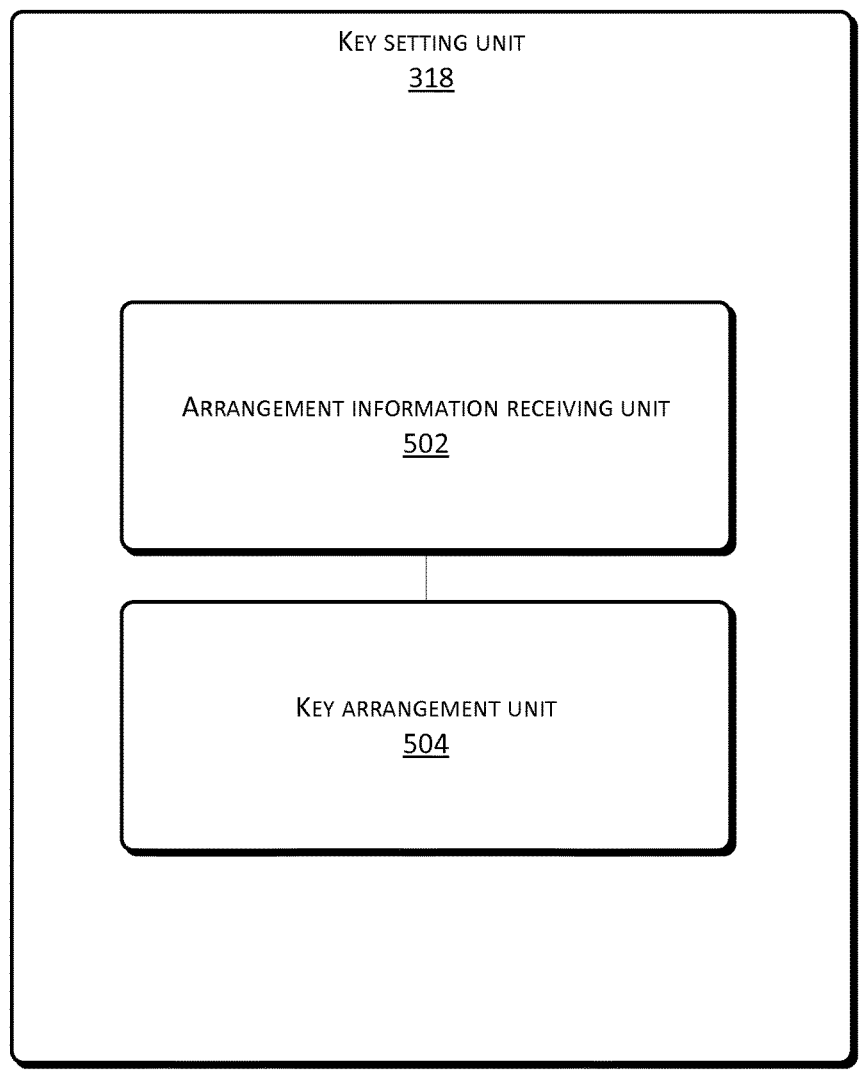
FIG. 5 is a structural diagram of an example key setting unit in the first example password input interface display system according to the present disclosure.

FIG. 5 is a structural diagram of the key setting unit 318 in the first example embodiment of the system 300 according to the present disclosure. As shown in FIG. 5, the key setting unit 318 may include an arrangement information receiving unit 502 and a key arrangement unit 504.

The arrangement information receiving unit 502 receives the key arrangement information input by the user. The key arrangement information may include a total number of keys and/or a key arrangement form. The key arrangement form may be a form of a rectangular array, a form of a rhombic array, or a form of a circular array.

The key arrangement unit 504 arranges the key on the password input interface according to the key arrangement information. The total number of keys displayed on the password input interface may be greater than or equal to the total number of keys input by the user.

For example, the password input interface display system 300 may include both the name setting unit and the key setting unit. A processing result of the name setting unit may be input to the key setting unit for processing, and a processing result of the key setting unit may be input to the interface setting triggering unit 306 for processing. Alternatively, a processing result of the key setting unit may be input to the name setting unit for processing, and a processing result of the name setting unit may be input to the interface setting triggering unit 306 for processing. The present disclosure does not impose any restriction.

The first example embodiment of the above password input interface display system is corresponding to the first example embodiment of the password input interface display method, and implements the effect of the first example embodiment of the password input interface display method.

Figure 6:
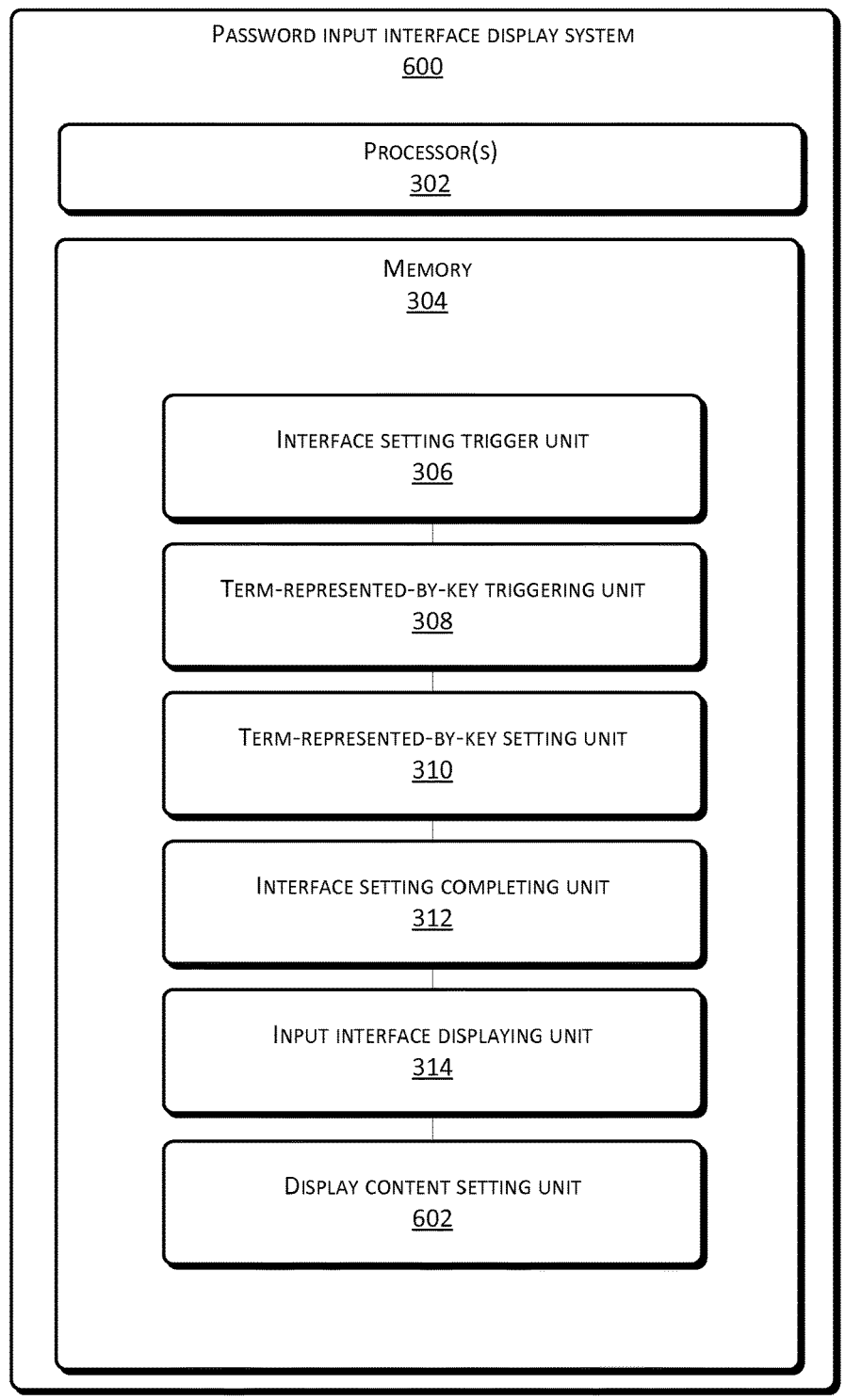
FIG. 6 is a structural diagram of a second example password input interface display system according to the present disclosure.

A second example embodiment of a password input interface display system of the present disclosure is described in the following. FIG. 6 is a structural diagram of a second example embodiment of a password input interface display system 600 according to the present disclosure. As shown in FIG. 6, a difference between the second example embodiment of the password input interface display system 600 and the first example embodiment of the password input interface display system 300 is that the password input interface display system 600 includes a display content setting unit 602.

The display content setting unit 602 receives display content information input and/or selected by the user, and sets the display content of the key on the password input interface according to the display content information.

Figure 7:
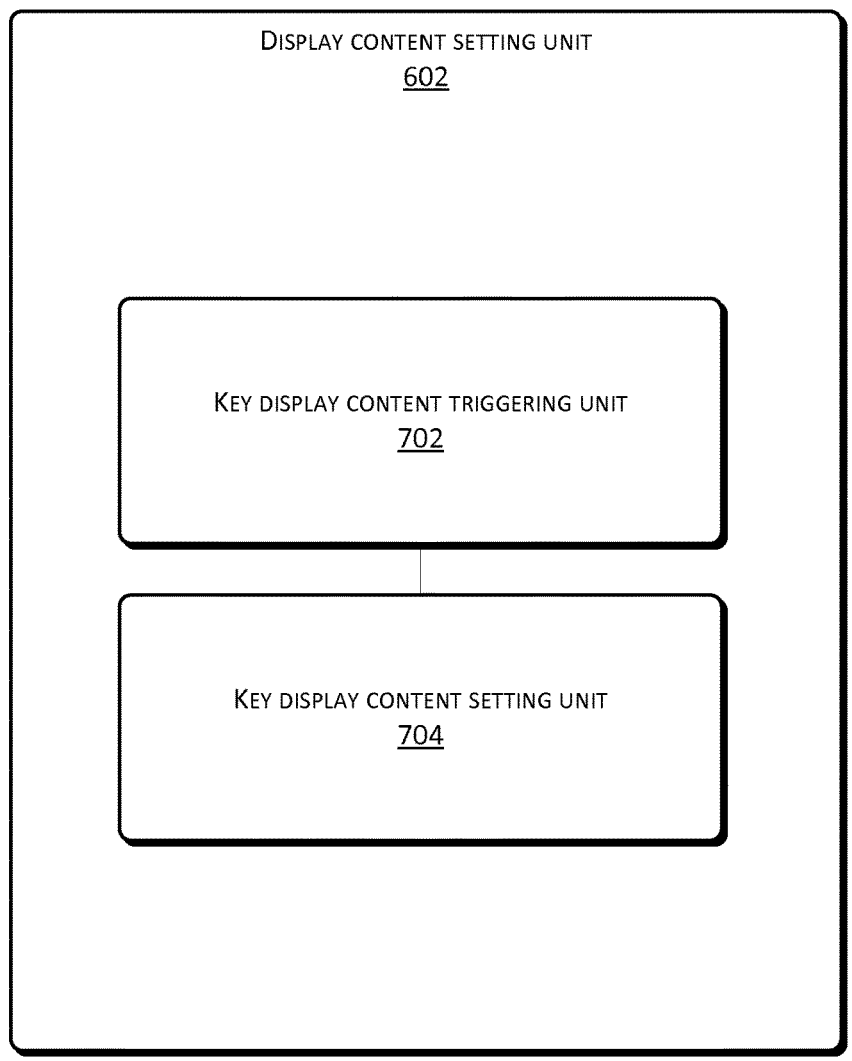
FIG. 7 is a structural diagram of an example display content setting unit in the second example password input interface display system according to the present disclosure.

FIG. 7 is a structural diagram of a display content setting unit 602 in the second example embodiment of the password input interface display system 600 according to the present disclosure. As shown in FIG. 7, the display content setting unit 602 may further include a key display content triggering unit 702 and a key display content setting unit 704.

The key display content triggering unit 702 receives a trigger instruction to set a display content of the key.

The key display content setting unit 704 receives a user's selection and/or input of the display content of the key on the password input interface, establishes a second corresponding relationship between the key and the display content, and receives an instruction from the user that completes the setting of the display content of the key.

Figure 8:
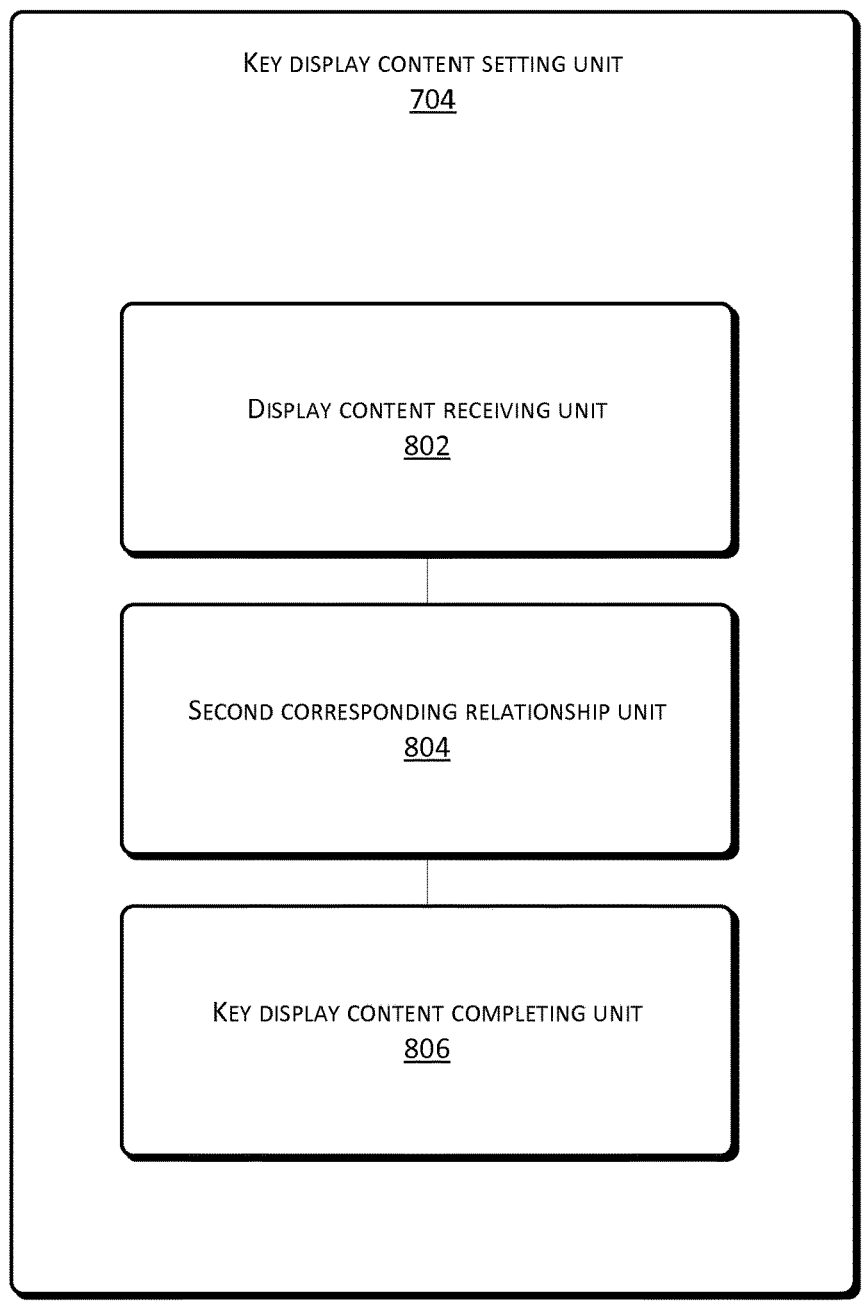
FIG. 8 is a structural diagram of an example key display content setting unit in the second example password input interface display system according to the present disclosure.

FIG. 8 is a structural diagram of a key display content setting unit 704 in the display content setting unit 602 in the second embodiment of the password input interface display system 600 according to the present disclosure. As shown in FIG. 8, the key display content setting unit 704 may include a display content receiving unit 802, a second corresponding relationship unit 804, and a key display content completing unit 806.

The display content receiving unit 802 receives the user's selection and/or input of the display content of the key on the password input interface.

The second corresponding relationship unit 804 establishes the second corresponding relationship between the key and the display content, and stores the second correspondence.

The key display content completing unit 806 receives an instruction from the user that completes the setting of the display content of the key, and completes the setting of the display content of the key.

Other parts of this second example embodiment are the same as those in the first example embodiment of the password input interface display system, and reference may be made to the first example embodiment of the password input interface display system of the present disclosure.

For example, the display content setting unit 602 may process the result after the processing of the term-represented-by-key setting unit 310. The display content setting unit 602 may further process the result after the processing of the interface setting triggering unit 306, and the result of the display content setting unit 602 may be input to the term-represented-by-key triggering unit 308 for processing, which will not be limited by the present disclosure.

The second example embodiment of the password input interface display system 600 is corresponding to the second example embodiment of the password input interface display method, and implements the effect of the second embodiment of the password input interface display method.

In 1990s, an improvement to a technology may be distinguished as an improvement to hardware (for example, an improvement to a circuit structure such as a diode, a transistor, and a switch) and an improvement to software (for example, an improvement to a method process). However, along with the development of the technologies, currently, many improvements to method processes may be considered as direct improvements to hardware circuit structure. Almost all of the designers acquire a corresponding hardware circuit structure by programming an improved method process into a hardware circuit. Therefore, it cannot be considered that an improvement to a method process cannot be implemented by using a hardware entity module. For example, a Programmable Logic Device (PLD) (such as a Field Programmable Gate Array (FPGA)) is such an integrated circuit that its logic function is determined by programming a device by a user. A designer may program by his/her own to "integrate" a digital system with a PLD, without inviting a chip manufacturer to design and manufacture a dedicated integrated circuit chip. Moreover, currently, instead of manually manufacturing an integrated circuit chip, in most cases, such programming will be implemented by "logic compiler" software, which is similar to the software compiler used for developing and writing a program, and original codes before compiling must be written by using a specific programming language, which is referred to as a Hardware Description Language (HDL). There is not only one but several types of HDL, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, the most commonly used is a Very-High-Speed Integrated Circuit Hardware Description Language (VHDL) and Verilog2. One of ordinary skill in the art shall know that, by simply performing a logic programming on the method process by using the above several HDLs and programming them into an integrated circuit, a hardware circuit capable of implementing the logic method process is acquired easily.

The controller may be implemented in any suitable mode. For example, the controller may be in a form of a microprocessor or processor and a computer readable medium for storing computer readable program codes (for example, software or firmware) executable by the (micro)processor, a logic gate, a switch, an Application Specific Integrated Circuit (ASIC), a programmable logic controller and an embedded microcontroller. Examples of the controller include, but not limited to, the following microcontrollers: ARC 625D, Atmel AT91SAM, Microchip PIC18F26K20, and Silicone Labs C8051F320. A memory controller may also be implemented as a part of control logic of the memory.

One of ordinary skill in the art should also know that, in addition to implementing the controller by only using computer readable program code, the method or step may be logically programmed to enable the controller to implement the same function in a form of a logic gate, a switch, an ASIC, a programmable logic controller and an embedded microcontroller. Therefore, this type of controller may be considered as a hardware component, and apparatuses included therein and used for implementing various functions may also be considered as structures inside the hardware component. Alternatively, further, the apparatuses used for implementing various functions may be considered either as software modules for implementing the method or the structures inside the hardware component.

The system, apparatus, module or unit illustrated in the above embodiments may be implemented specifically by using a computer chip or an entity, or a product with a certain function.

For ease of description, when it comes to the apparatus, it will be divided into various units in terms of functions, which will be described respectively. Certainly, when the present disclosure is implemented, the functions of the units may be implemented in the same or multiple software and/or hardware.

Based on the foregoing descriptions of the implementation manners, one of ordinary skill in the art may clearly understand that the present disclosure may be implemented by software plus necessary universal hardware platform. Based on such understanding, the technical solutions of the present disclosure or the part contributing to the prior art may be implemented in a form of a software product. In a typical configuration, a computing device includes one or more processors (CPU), an input/output interface, a network interface, and a memory. The computer software product may include several computer readable or executable instructions to cause a computing device (which may be a personal computer, a server, or a network device, etc.) to execute the method described in each embodiment or some parts of the embodiment of the present disclosure. The computer software product may be stored in a memory, and the memory may include a volatile memory, a random access memory (RAM) and/or a non-volatile memory or the like in a computer readable medium, for example, a read only memory (ROM) or a flash RAM.

Computer readable media include permanent, nonpermanent, mobile and immobile media, which may implement information storage through any method or technologies. The information may be computer-readable or computer-executable instructions, data structures, program modules or other data. Examples of computer readable media include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EEPROMs), flash memories or other internal memory technologies, Compact Disk Read-Only Memories (CD-ROMs), Digital Versatile Discs (DVDs) or other optical memories, cassettes, cassette and disk memories or other magnetic memory devices or any other non-transmission media, which may be used for storing information which may be accessed by the computation device. According to the definitions herein, the computer readable media does not include transitory media such as a modulated data signal and a carrier wave.

The embodiments in the specification are described in a progressive manner. For the same or similar parts in the embodiments, reference may be made to each other. Each embodiment describes in emphasis what is different from other embodiments. In particular, for the system embodiments, since they are basically similar to the method embodiments, the descriptions are relatively simple. For details about related content, reference may be made to the descriptions of the method embodiments.

The present disclosure may be applicable to various universal or dedicated computer system environments or configurations, such as, a personal computer, a server computer, a handheld device or a portable device, a tablet device, a multi-processor system, a microprocessor-based system, a set top box, a programmable consumer electronic device, a network PC, a microcomputer, a mainframe computer, and a distributed computing environment including any of the above systems or devices.

The present disclosure may be described in a common context of a computer executable instruction executed by a computing device, for example, a program module. Generally, the program module includes a routing, a program, an object, an assembly, a data structure, and the like used for executing a specific task or implementing a specific abstract data type. The present disclosure may be implemented in a distributed computing environment, and in the distributed computer environment, a task is executed by using remote processing devices connected through a communications network. In the distributed computer environment, the program module may be located in a local and remote computer storage medium including a storage device.

Although the present disclosure is described through the example embodiments, one of ordinary skill in the art should know that the present disclosure has many variations and changes without departing from the spirit of the present disclosure, and the claims cover the variations and changes without departing from the spirit of the present disclosure.

What is claimed is:

1. A password input interface display method comprising:
    receiving a selection or input of a plurality of terms to be represented by a plurality of keys on a password input interface;
    displaying a plurality of different display contents for a user to select as a respective display content of a key of the plurality of keys for a term of the plurality of terms to be represented by the key of the plurality of keys in response to receiving the selection or input of the term of the plurality of terms, the plurality of different display contents to be selected as the respective display content of the key including a picture that is inconsistent with the term represented by the key, another term that is different from the term represented by the key, and a blank that is inconsistent with the term represented by the key;
    receiving a selection of the respective display content of the key among the plurality of different display content from the user;
    establishing a first corresponding relationship between the plurality of keys and the plurality of terms;
    receiving key arrangement information input by the user;
    displaying the plurality of keys on the password input interface according to the key arrangement information;
    determining a total number of keys displayed on the password input interface according to a total number of keys input by the user, the total number of keys displayed on the password input interface being greater than or equal to the total number of keys input by the user;
    receiving name information input by the user;
    using the name information as a name of the password input interface;
    receiving an input of the name of the password input interface from the user;
    selecting and displaying the password input interface from among a plurality of different input interfaces according to the established first corresponding relationship between the plurality of keys and the plurality of terms; and
    receiving an input of a password from the user via the password input interface, wherein all terms of the password input by the user are included in the password input interface without a need of switching to other input interfaces of the plurality of input interfaces for any term of the password.

2. The password input interface display method of claim 1, further comprising:
    receiving a trigger instruction from the user to set the password input interface;
    displaying the password input interface including arranged keys;
    receiving a trigger instruction to set the plurality of terms represented by the plurality of keys; and
    triggering the setting of the plurality of terms represented by the plurality of keys.

3. The password input interface display method of claim 1, further comprising receiving an instruction from the user to complete the setting of the password input interface.

4. The password input interface display method of claim 3, wherein displaying the password input interface comprises displaying the password input interface according to the first corresponding relationship between the plurality of keys and the plurality of terms.

5. The password input interface display method of claim 1, further comprising establishing a second corresponding relationship between the key and the respective display content.

6. The password input interface display method of claim 5, further comprising displaying the password input interface according to the second corresponding relationship between the key and the respective display content.

7. The password input interface display method of claim 1, wherein the key arrangement information includes the total number of keys input by the user or a key arrangement form input by the user.

8. The password input interface display method of claim 7, wherein the key arrangement form includes:
    a form of a rectangular array;
    a form of a rhombic array; or
    a form of a circular array.

9. One or more non-transitory media storing executable instructions that, when executed by one or more processors, cause the one or more processors to perform acts comprising:
    receiving a selection or input of a plurality of terms to be represented by a plurality of keys on a password input interface;
    displaying a plurality of different display contents for a user to select as a respective display content of a key of the plurality of keys for a term of the plurality of terms to be represented by the key of the plurality of keys in response to receiving the selection or input of the term of the plurality of terms, the plurality of different display contents to be selected as the respective display content of the key including a picture that is inconsistent with the term represented by the key, another term that is different from the term represented by the key, and a blank that is inconsistent with the term represented by the key;
    receiving a selection of the respective display content of the key among the plurality of different display content from the user;

establishing a first corresponding relationship between the plurality of keys and the plurality of terms;
receiving key arrangement information input by the user;
displaying the plurality of keys on the password input interface according to the key arrangement information;
determining a total number of keys displayed on the password input interface according to a total number of keys input by the user, the total number of keys displayed on the password input interface being greater than or equal to the total number of keys input by the user;
receiving name information input by the user;
using the name information as a name of the password input interface;
receiving an input of the name of the password input interface from the user;
selecting and displaying the password input interface from among a plurality of different input interfaces according to the established first corresponding relationship between the plurality of keys and the plurality of terms; and
receiving an input of a password from the user via the password input interface, wherein all terms of the password input by the user are included in the password input interface without a need of switching to other input interfaces of the plurality of input interfaces for any term of the password.

10. The one or more non-transitory media of claim 9, wherein the acts further comprise:
receiving a trigger instruction from the user to set the password input interface;
displaying the password input interface including arranged keys;
receiving a trigger instruction to set the plurality of terms represented by the plurality of keys; and
triggering the setting of the plurality of terms represented by the plurality of keys.

11. The one or more non-transitory media of claim 9, wherein the acts further comprise receiving an instruction from the user to complete the setting of the password input interface.

12. The one or more non-transitory media of claim 11, wherein displaying the password input interface comprises displaying the password input interface according to the first corresponding relationship between the plurality of keys and the plurality of terms.

13. The one or more non-transitory media of claim 9, wherein the acts further comprise establishing a second corresponding relationship between the key and the respective display content.

14. The one or more non-transitory media of claim 9, wherein the acts further comprise displaying the password input interface according to the second corresponding relationship between the key and the respective display content.

15. A system comprising:
one or more processors;
memory storing executable instructions that, when executed by one or more processors, cause the one or more processors to perform acts comprising:
receiving a selection or input of a plurality of terms to be represented by a plurality of keys on a password input interface;
displaying a plurality of different display contents for a user to select as a respective display content of a key of the plurality of keys for a term of the plurality of terms to be represented by the key of the plurality of keys in response to receiving the selection or input of the term of the plurality of terms, the plurality of different display contents to be selected as the respective display content of the key including a picture that is inconsistent with the term represented by the key, another term that is different from the term represented by the key, and a blank that is inconsistent with the term represented by the key;
receiving a selection of the respective display content of the key among the plurality of different display content from the user;
establishing a first corresponding relationship between the plurality of keys and the plurality of terms;
receiving key arrangement information input by the user;
displaying the plurality of keys on the password input interface according to the key arrangement information;
determining a total number of keys displayed on the password input interface according to a total number of keys input by the user, the total number of keys displayed on the password input interface being greater than or equal to the total number of keys input by the user;
receiving name information input by the user;
using the name information as a name of the password input interface;
receiving an input of the name of the password input interface from the user;
selecting and displaying the password input interface from among a plurality of different input interfaces according to the established first corresponding relationship between the plurality of keys and the plurality of terms; and
receiving an input of a password from the user via the password input interface, wherein all terms of the password input by the user are included in the password input interface without a need of switching to other input interfaces of the plurality of input interfaces for any term of the password.

16. The system of claim 15, wherein the acts further comprise:
receiving a trigger instruction from the user to set the password input interface;
displaying the password input interface including arranged keys;
receiving a trigger instruction to set the plurality of terms represented by the plurality of keys; and
triggering the setting of the plurality of terms represented by the plurality of keys.

17. The system of claim 15, wherein the acts further comprise receiving an instruction from the user to complete the setting of the password input interface.

18. The system of claim 17, wherein displaying the password input interface comprises displaying the password input interface according to the first corresponding relationship between the plurality of keys and the plurality of terms.

19. The system of claim 15, wherein the acts further comprise establishing a second corresponding relationship between the key and the respective display content.

20. The system of claim 15, wherein the acts further comprise displaying the password input interface according to the second corresponding relationship between the key and the respective display content.

* * * * *